US006697782B1

United States Patent
Iso-Sipiläet al.

(10) Patent No.: US 6,697,782 B1
(45) Date of Patent: Feb. 24, 2004

(54) METHOD IN THE RECOGNITION OF SPEECH AND A WIRELESS COMMUNICATION DEVICE TO BE CONTROLLED BY SPEECH

(75) Inventors: Juha Iso-Sipilä, Tampere (FI); Kari Laurila, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/483,770

(22) Filed: Jan. 18, 2000

(30) Foreign Application Priority Data

Jan. 18, 1999 (FI) .................................................. 990077

(51) Int. Cl.[7] .......................... G10L 21/00; G10L 15/00
(52) U.S. Cl. ........................................ 704/275; 704/231
(58) Field of Search ................................. 704/251, 252, 704/275

(56) References Cited

U.S. PATENT DOCUMENTS

| 4,783,803 A | * | 11/1988 | Baker et al. ............... 704/252 |
| 4,811,399 A | * | 3/1989 | Landell et al. ............. 704/253 |
| 5,566,272 A | | 10/1996 | Brems et al. ............... 395/2.4 |
| 5,640,485 A | | 6/1997 | Ranta ......................... 395/2.6 |
| 6,018,711 A | * | 1/2000 | French-St. George et al. ........................... 704/275 |
| 6,397,180 B1 | * | 5/2002 | Jaramillo et al. ........... 704/252 |

\* cited by examiner

Primary Examiner—Richemond Dorvil
Assistant Examiner—V. Paul Harper
(74) Attorney, Agent, or Firm—Perman & Green, LLP (57) ABSTRACT

A method for recognizing speech commands includes defining a time window for recognizing a speech command. A first confidence value is determined for a first recognition result. If the first confidence value is greater than or equal to a first threshold value, the first recognition result is selected as the speech command, otherwise a second recognition stage is performed where the time window is extended. A second confidence value is determined for the second recognition result. If the second confidence value is greater than or equal to the first threshold value, a command word selected at the second recognition stage is selected as the speech command, otherwise the first and second recognition results are compared to each other to determine a probability that they are substantially the same. If the probability exceeds a predetermined value, the command word selected at the second stage is selected as the speech command.

14 Claims, 5 Drawing Sheets

METHOD IN THE RECOGNITION OF SPEECH AND A WIRELESS COMMUNICATION DEVICE TO BE CONTROLLED BY SPEECH

The present invention relates to a method for recognizing speech commands, in which a group of command words selectable by speech commands are defined, a time window is defined, within which the recognition of the speech command is performed, and a first recognition stage is performed, in which the recognition result of the first recognition stage is selected.

The present invention also contemplates a speech recognition device in which a vocabulary of selectable command words is defined. The device includes means for measuring the time used for recognition and comparing it with a predetermined time window, and means for selecting a first recognition result.

The present invention also includes a wireless communication device to be controlled by speech comprising means for recognizing speech commands, in which a vocabulary of selectable command words is defined, the means for recognizing speech commands comprising means for measuring the time used for recognition and comparing it with a predetermined time window, and means for selecting a first recognition result.

For facilitating the use of wireless communication devices, so-called hands free devices have been developed, whereby the wireless communication device can be controlled by speech. Thus, speech can be used to control different functions of the wireless communication device, such as turning on/off, transmission/reception, control of sound volume, selection of telephone number, or answering a call, whereby particularly in the use in a vehicle, it is easier for the user to concentrate on the driving.

One drawback in a wireless communication device controlled by speech is that speech recognition is not fully faultless. In a car, the background noise caused by the environment has a high volume, thereby making it difficult to recognize speech. Due to the unreliability of the speech recognition, users of wireless communication devices have so far shown relatively little interest in the control by speech. The recognition capability of present speech recognizers is not particularly good, especially under difficult conditions, such as in a moving car, where the high volume of background noise hampers reliable recognition of words substantially. Incorrect recognition decisions cause most problems usually in the implementation of the user interface, because incorrect recognition decisions may start undesired functions, such as terminating a call during a call, which is naturally particularly disturbing to the user. One result of an incorrect recognition decision may be that a call is connected to an incorrect number. For this reason, the user interface is designed in such way that the user usually is asked to repeat a command if the speech recognizer does not have sufficient certainty of a word uttered by the user.

Almost all speech recognition devices are based on the functional principle that a word uttered by the user is compared, by an usually rather complicated method, with a group of reference words previously stored in the memory of the speech recognition device. Speech recognition devices usually calculate a figure for each reference word to describe how much the word uttered by the user resembles the reference word. The recognition decision is finally made on the basis of these figures so that the decision is to select the reference word which the uttered word resembles most. The best known methods in the comparison between the uttered word and the reference words are dynamic time warping (DTW) and the statistical hidden Markov model (HMM).

In both the DTW and the HMM methods, an unknown speech pattern is compared with known reference patterns. In dynamic time warping, the speech pattern is divided into several frames, and the local distance between the speech pattern included in each frame and the corresponding speech segment of the reference pattern is calculated. This distance is calculated by comparing the speech segment and the corresponding speech segment of the reference pattern with each other, and it is thus a kind of numerical value for the differences found in the comparison. For speech segments close to each other, a smaller distance is usually obtained than for speech segments further from each other. On the basis of local distances obtained this way, a minimum path between the beginning and end points of the word are sought by using a DTW algorithm. Thus, by dynamic time warping, a distance is obtained between the uttered word and the reference word. In the HMM method, speech patterns are produced, and this stage of speech pattern generating is modelled with a state change model according to the Markov method. The state change model in question is thus the HMM. In this case, speech recognition on received speech patterns is performed by defining a observation probability on the speech patterns according to the hidden Markov model. In speech recognition by using the HMM method, an HMM model is first formed for each word to be recognized, i.e. for each reference word. These HMM models are stored in the memory of the speech recognition device. When the speech recognition device receives the speech pattern, a observation probability is calculated for each HMM model in the memory, and as the recognition result, a counterpart word is obtained for the HMM model with the greatest observation probability. Thus for each reference word the probability is calculated that it is the word uttered by the user. The above-mentioned greatest observation probability describes the resemblance of the received speech pattern and the closest HMM model, i.e. the closest reference speech pattern.

Thus, in present systems the speech recognition device calculates a certain figure for the reference words on the basis of the word uttered by the user. In the DTW method, the figure is the distance between the words, and in the HMM method, the figure is the probability for the equality of the uttered word and the HMM model. When the HMM method is used, the speech recognition devices are usually set a certain threshold probability which the most probable reference word must achieve to make the recognition decision. Another factor affecting the recognition decision can be e.g. the difference between the probabilities of the most probable and the second probable word, which must be sufficiently great to make the recognition decision. Thus, it is possible that when the background noise has a high volume, on the basis of a command uttered by the user, the reference word in the memory, e.g. the reference word "yes", obtains at each attempt the greatest probability in relation to the other reference words, e.g. the probability 0.8. If the threshold probability is for example 0.9, the recognition is not accepted and the user may have to utter the command several times until the recognition probability threshold is exceeded and the speech recognition device accepts the command, even though the probability may have been very close to the acceptable value. This is very disturbing to the user.

Furthermore, the speech recognition is hampered by the fact that different users utter the same words in different ways, wherein the speech recognition device works better when used by one user than when used by another user. In practice, it is very difficult with the presently known techniques to adjust the certainty levels of speech recognition devices to consider all users. When adjusting the required certainty level e.g. for the word "yes" in speech recognition devices of prior art, the required threshold is typically set according to so-called worst speakers. Thus, the problem emerges that words close to the word "yes" also become incorrectly accepted. The problem is aggravated by the fact that in some situations, mere background noise may be recognized as command words. In speech recognition devices of prior art, the aim is to find a suitable balance in which a certain part of the users have great problems in having their words accepted and the number of incorrectly accepted words is sufficiently small. If the speech recognition device is adjusted in a way that a minimum number of users have problems in having their words accepted, this means in practice that the number of incorrectly accepted words will increase. Correspondingly, if the aim is set at as faultless a recognition as possible, an increasing number of users will have difficulties in having commands uttered by them accepted.

In speech recognition, errors are generally classified in three categories:

Insertion Error
  The user says nothing but a command word is recognized in spite of this, or the user says a word which is not a command word and still a command word is recognized.
Deletion Error
  The user says a command word but nothing is recognized.
Substitution Error
  The command word uttered by the user is recognized as another command word.

In a theoretical optimum solution, the speech recognition device makes none of the above-mentioned errors. However, in practical situations, as was already presented above, the speech recognition device makes errors of all the said types. For usability of the user interface, it is important to design the speech recognition device in a way that the relative shares of the different error types are optimal. For example in speech activation, where a speech-activated device waits even for hours for a certain activation word, it is important that the device is not erroneously activated at random. Furthermore, it is important that the command words uttered by the user are recognized at good accuracy. In this case, however, it is more important that no erroneous activations take place. In practice, this means that the user must repeat the uttered command word more often so that it would be recognized correctly at a sufficient probability.

In the recognition of a numerical sequence, almost all errors are equally significant. Any error in the recognition of the numbers in a sequence results in a false numerical sequence. Also the situation that the user says nothing and still a number is recognized, is inconvenient for the user. However, a situation in which the user utters a number indistinctly and the number is not recognized, can be corrected by the user by uttering the numbers more distinctly.

The recognition of a single command word is presently a very typical function implemented by speech recognition. For example, the speech recognition device may ask the user: "Do you want to receive a call?", to which the user is expected to reply either "yes" or "no". In such situations where there are very few alternative command words, the command words are often recognized correctly, if at all. In other words, the number of substitution errors in such a situation is very small. The greatest problem in the recognition of single command words is that an uttered command is not recognized at all, or an irrelevant word is recognized as a command word. In the following, there are three different alternative situations of this example:

1) A speech-controlled device asks the user: "Do you want to receive a call?", to which the user replies indistinctly: "Yes . . . ye-". The device does not recognize the user's reply and asks the user again: "Do you want to receive a call? Say yes or no." Thus the user may be easily frustrated, if the device often asks the user to repeat the command word uttered.

2) The device asks the user again: "Do you want to receive a call?", to which the user responds distinctly "yes". However, the device did not recognize this for certain and wants a confirmation: "Did you say yes?", to which the user replies again "yes". Even now, no reliable recognition was made, so the device asks again: "Did you say yes?". The user must repeat again the reply "yes", for the device to complete the recognition.

3) Still in a third example situation, the speech-controlled device asks the user, if s/he wants to receive a call. To this, the user mumbles something vague, and in spite of this, the device interprets the user's utterance as the command word "yes" and informs the user "All right, the call will be connected". Thus, in this situation, the interpretation of the device of the user's vague speech is closer to the word "yes" than to the word "no". Consequently, in this situation, words that resemble a command word begin to be incorrectly accepted.

In speech recognition methods according to prior art, it is typical to use in the recognition of the command word a time window of fixed length, during which the user must utter the command word. In another speech recognition method of prior art, the recognition probability is calculated for the command word uttered by the user, and if this probability does not exceed a predetermined threshold value, the user is requested to utter the command word again, after which a new calculation of the recognition probability is performed by utilizing the probability calculated in the previous recognition time. The recognition decision is made, if the threshold probability is achieved considering the previous probabilities. In this method, however, the utilization of repetition will easily result in an increase in the chance of the above-mentioned insertion error, wherein upon repeating a word outside the vocabulary, it is more easily recognized as a command word.

It is an aim of the present invention to provide an improved speech recognition method as well as a speech-controlled wireless communication device in which speech recognition is secured in view of prior art. The invention is based on the idea that the recognition probability calculated for an uttered command word is compared with the probability of background noise, wherein the confidence value thus obtained is used to deduce whether the recognition was positive. If the confidence value remains below a determined threshold for a positive recognition, the time window used in the recognition is extended and a new recognition is performed for the repeated utterance of the command word. If the repeated command word is not recognized at a sufficient confidence value, a comparison between the command words uttered by the user is still performed; thus, in case the recognitions of the words uttered by the user indicate that the user has uttered the same command word two times in succession, the recognition is accepted.

A method according to the present invention includes the following: a first confidence value is determined for the recognition result of the first recognition stage and a first threshold value is determined. The first confidence value is compared with the first threshold value, and if the first confidence value is greater than or equal to the first threshold value, the recognition result of the first recognition stage is selected as the recognition result of the speech command.

If the first confidence value is smaller than the first threshold value, a second recognition stage is performed for the speech command, where the time window is extended and a second confidence value is determined for the recognition result of the second recognition stage. The second confidence value is compared with the threshold value, and if the second confidence value is greater than or equal to the first threshold value, the command word selected at the second stage is selected as the recognition result for the speech command.

If the second confidence value is smaller than the first threshold value, a comparison stage is performed, where the first and second recognition results are compared to each other to determine a probability that they are substantially the same. If the probability exceeds a predetermined value, the command word selected at the second stage is selected as the recognition result for the speech command.

The speech recognition device according to the present invention includes means for calculating a first confidence value for the first recognition result, and means for comparing the first confidence value with a predetermined first threshold value, where the first recognition result is arranged to be selected as a final recognition result if the first confidence value is greater than or equal to the first threshold value.

The speech recognition device also includes means for performing the recognition stage of a second speech command, if the first confidence value is smaller than the first threshold value. The means for performing the recognition stage of the second speech command has means for extending the time window, means for selecting a second recognition result of the recognition stage of the second speech command, and means for calculating a second confidence value for the second recognition result. The means for performing the recognition stage of the second speech command also includes means for comparing the second confidence value with the predetermined first threshold value, where the second recognition result is arranged to be selected as the final recognition result, if the second confidence value is greater than or equal to the first threshold value.

In addition, the means for performing the recognition stage of the second speech command further includes means for performing a comparison stage, the comparison stage being arranged to be performed if the second confidence value is smaller than the first threshold value, where the means for performing a comparison stage includes a device for comparing the first and second recognition results to each other to determine a probability that they are substantially the same. If the probability exceeds a predetermined value, the second recognition result is selected as the final recognition result.

Furthermore, the wireless communication device according to the present invention has means for calculating a first confidence value for the first recognition result, and means for comparing the first confidence value with a predetermined first threshold value, where the first recognition result is arranged to be selected as a final recognition result if the first confidence value is greater than or equal to the first threshold value.

The wireless communication device includes means for performing the recognition stage of a second speech command if the first confidence value is smaller than the first threshold value. The means for performing the recognition stage of the second speech command has means for extending the time window, means for selecting a second recognition result of the recognition stage of the second speech command, and means for calculating a second confidence value for the second recognition result. The means for performing the recognition stage of the second speech command also has means for comparing the second confidence value with the predetermined first threshold value, where the second recognition result is arranged to be selected as the final recognition result if the second confidence value is greater than or equal to the first threshold value.

The means for performing the recognition stage of the second speech command still further includes means for performing a comparison stage, the comparison stage being arranged to be performed if the second confidence value is smaller than the first threshold value, where the means for performing a comparison stage includes a device for comparing the first and second recognition results to each other to determine a probability that they are substantially the same, where if the probability exceeds a predetermined value, the second recognition is selected as the final recognition result.

The present invention provides significant advantages to speech recognition methods and devices of prior art. With the method according to the invention, a smaller probability of insertion errors is obtained than is possible to achieve with methods of prior art. In the method of the invention, when the recognition is not certain, the time for interpreting the command word is extended, wherein the user has a possibility to repeat the command word given. According to the invention, it is additionally possible, if necessary, to effectively utilize the repetition of the command word by making a comparison with the command word uttered earlier by the user, which comparison improves the recognition of the command word significantly. Thus, the number of incorrect recognitions can be significantly reduced. Also the probability of such situations in which a command word is recognized although the user did not utter a command word, is reduced significantly. The method of the invention renders it possible to use such confidence levels in which the number of incorrectly recognized command words is minimal. Users who do not have their speech commands easily accepted in solutions of prior art can, by repetition of the command word according to the invention, significantly improve the probability of acceptance of speech commands uttered.

In the following, the invention will be described in more detail with reference to the appended drawings, in which.

Figure 1:
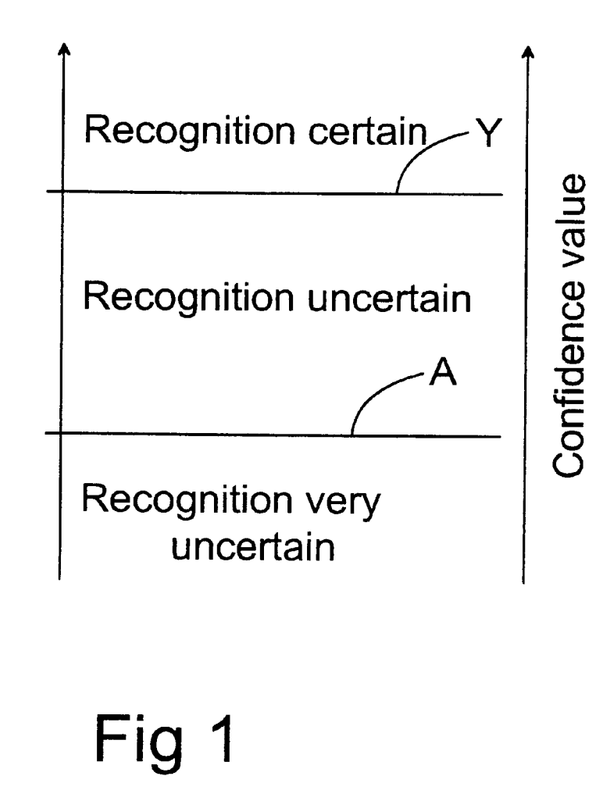
FIG. 1 shows recognition thresholds used in the method according to an advantageous embodiment of the invention.

In the following, we will describe the function of the speech recognition device according to an advantageous embodiment of the invention. In the method, a command word uttered by the user is recognized by calculating, in a way known as such, the probability for how close the uttered word is to different command words. On the basis of these probabilities calculated for the command words, the command word with the greatest probability is advantageously selected. After this, the probability calculated for the recognized word is compared with the probability produced by a background noise model. The background noise model represents general background noise and also all such words which are not command words. Thus, a probability is calculated here for the possibility that the recognized word is only background noise or a word other than a command word. On the basis of this comparison, a first confidence value is obtained, to indicate how positively the word was recognized. FIG. 1 illustrates the determination of the confidence of this recognition by using threshold values and said confidence value. In the method according to an advantageous embodiment of the invention, a first threshold value is determined, indicated in the appended figure with the reference Y. It is the limit determined for the confidence value that the recognition is positive (the confidence value is greater than or equal to the first threshold value Y). In the method according to a second advantageous embodiment of the invention, also a second threshold value is determined, indicated in the appended figure with the reference A. This indicates whether the recognition was uncertain (the confidence value is greater than or equal to the second threshold value A but smaller than the first threshold value Y) or very uncertain (the threshold value is smaller than the second threshold value A).

Figure 2:
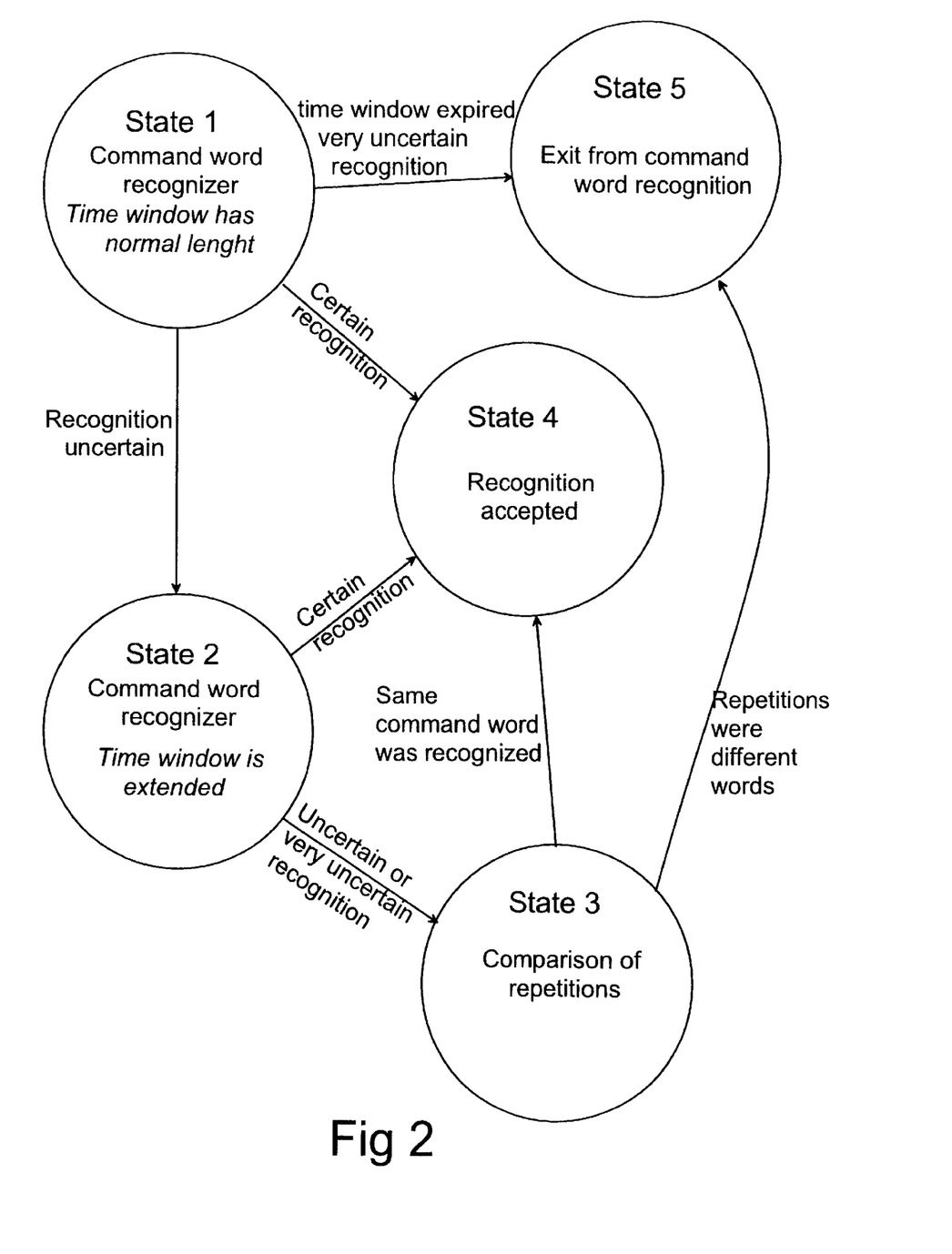
FIG. 2 shows a method according to an advantageous embodiment of the invention in a state machine presentation.

In the state machine presentation of FIG. 2, state 1 represents the recognition of a command word. At this stage of recognizing the command word, probabilities are determined on the basis of the command word uttered by the user for different command words in the vocabulary of the speech recognition device. As the command word corresponding to the speech command uttered by the user is selected, preliminarily, the command word with the greatest probability. For the selected command word, said confidence value is determined and compared with the first threshold value Y and the second threshold value A to deduce whether the recognition was certain, uncertain or very uncertain. If the confidence value is greater than or equal to the first threshold value 6, the operation moves on to state 4 to accept the recognition. If the confidence value remained smaller than the second threshold value A, the operation moves on to state 5 to exit from the command word recognition, i.e. to reject the recognition. If the confidence value was greater than or equal to the second threshold value A but smaller than the first threshold value Y, the recognition was uncertain, and the operation moves on to state 2. Thus, the time window is extended, i.e. the user will have more time to say the uttered command word again. The operation can move on to this state 2 also because of an incorrect word, e.g. as a result of a word uttered very unclearly by the user or as a result of incorrect recognition caused by background noise. In this state 2, the repetition of the command word is waited for the time of the extended time window. If the user uttered a command word again in this time window, the command word is recognized and the confidence value is calculated, as presented above in connection with the state 1. If at this stage the calculated confidence value indicates that the command word uttered at this second stage is recognized with sufficient confidence, the operation moves on to the state 4 and the recognition is accepted. For example, in a situation when the user may have said something vague in the state 1 but has uttered the correct command word clearly in the state 2, the recognition can be made solely on the basis of this command word uttered in the state 2. Thus, no comparison will be made between the first and second command words uttered, because this would easily lead to a less secure recognition decision.

Nevertheless, if the command word cannot be recognized with sufficient confidence in the state 2, the operation moves on to state 3 for comparison of the repeated command words. If this comparison indicates that the command word repeated by the user was very close to the command word first said by the user, i.e. the same word was probably uttered twice in succession, the recognition is accepted and the operation moves on to the state 4. However, if the comparison indicates that the user has probably not said the same word twice, the operation moves on to the state 5 and the recognition is rejected.

Figure 3:
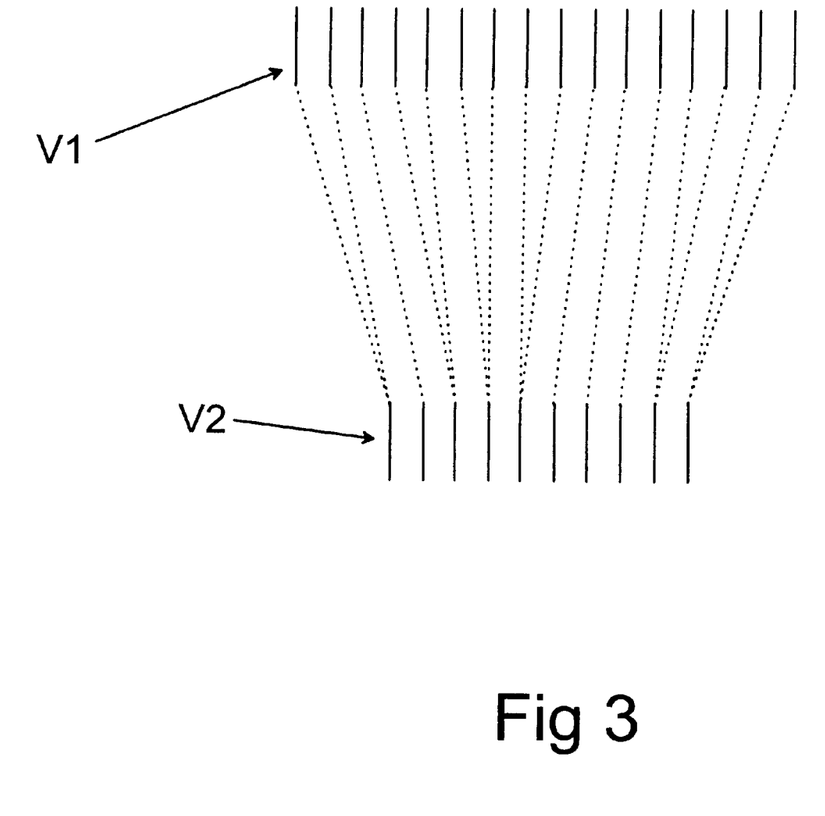
FIG. 3 illustrates time warping of feature vectors.
Figure 4:
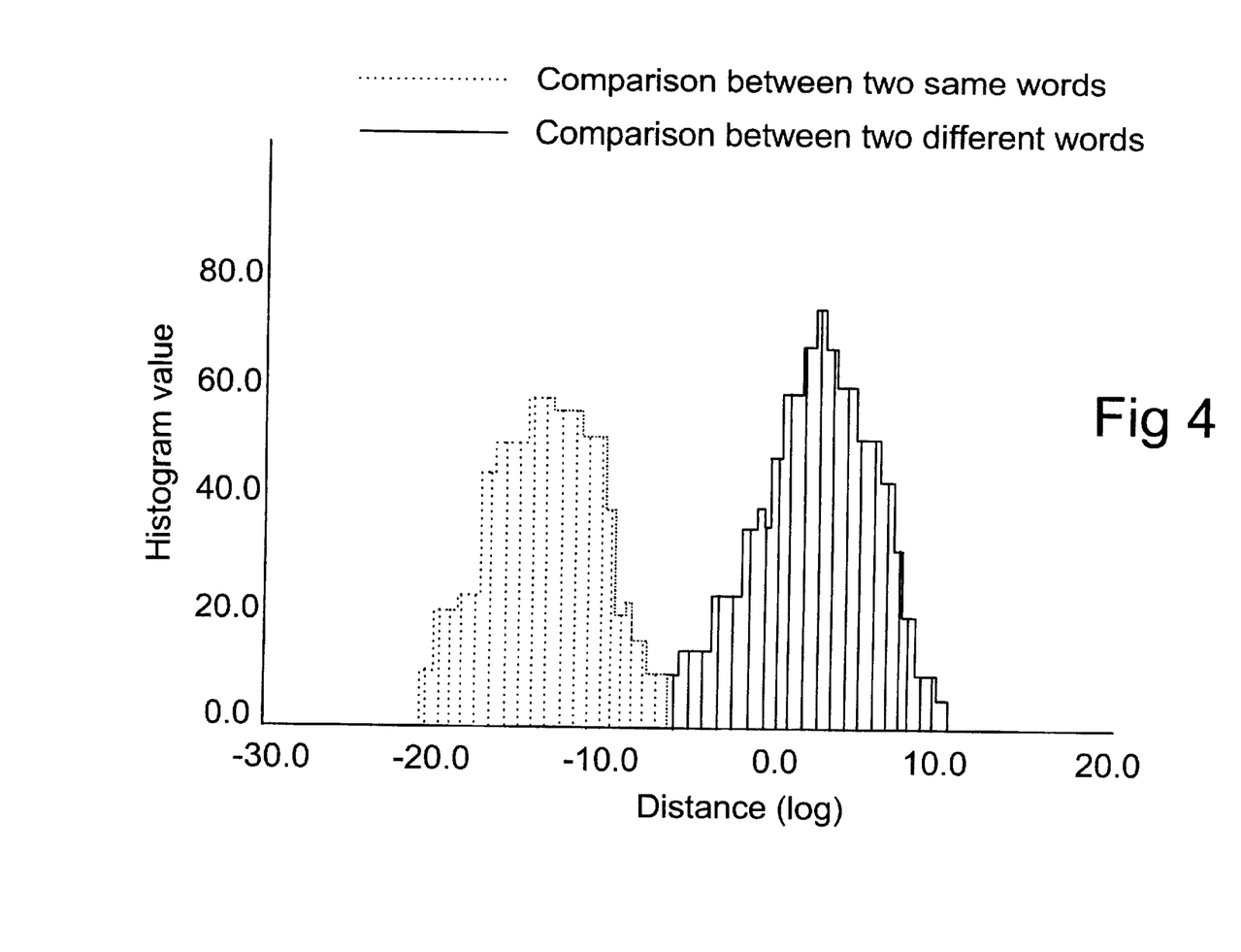
FIG. 4 illustrates the comparison of two words in a histogram.
Figure 5:
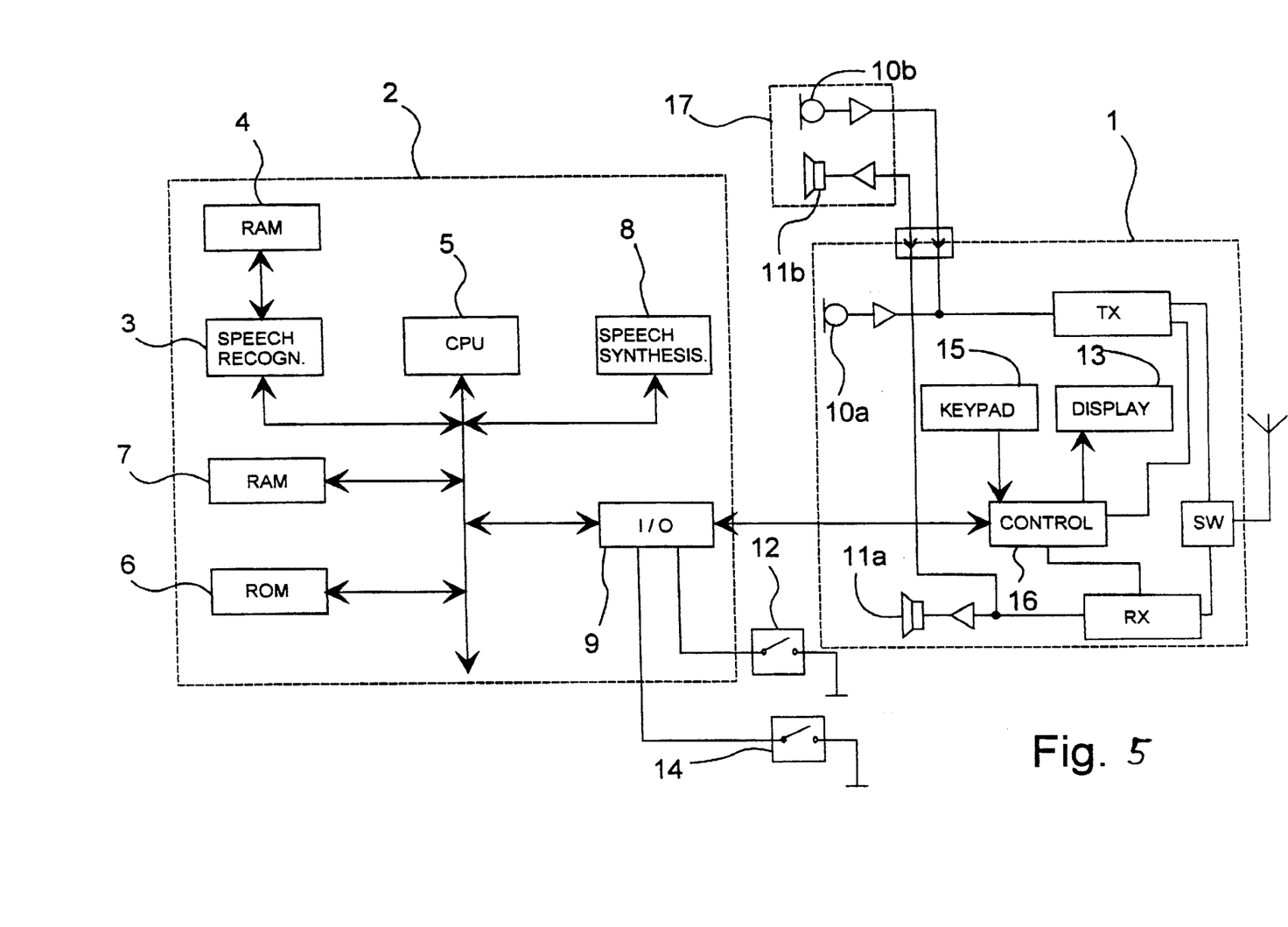
FIG. 5 illustrates a wireless communication device according to an advantageous embodiment of the invention in a reduced schematic diagram.

Consequently, in the method of the invention, when the first step indicates an uncertain recognition, a second recognition is made preferably by a recognition method known as such. If this second step provides no sufficient certainty of the recognition, a comparison of the repetitions is made advantageously in the following way. In the state 1, feature vectors formed of the command word uttered by the user are stored in a speech response memory 4 (FIG. 5). Such feature vectors are distinguished from the speech typically at intervals of ca. 10 ms, i.e. ca. 100 feature vectors per second. Also in the state 2, feature vectors formed of the command word uttered at this stage are stored in the speech response memory 4. After this, the recognition moves on to the state 3, in which these feature vectors stored in the memory are compared preferably by dynamic time warping. FIG. 3 illustrates this dynamic time warping of feature vectors in a reduced manner. At the top of the figure are shown feature vectors produced by the first recognition, indicated with the reference number V1, and correspondingly, at the bottom of the figure are shown feature vectors produced by the second recognition and indicated with the reference number V2. In this example, the first word was longer than the second word, i.e. the user has said the word faster at the second stage, or the words involved are different. Thus, for the feature vectors of the shorter word, in this case the second word, one or more corresponding feature vectors are found from the longer word by time warping the feature vectors of the two words in a way that they correspond to each other optimally. In this example, these time warping results are indicated by broken lines in FIG. 3. The distance between the words is calculated e.g. as a Euclidean distance between the warped feature vectors. If the calculated distance is small, it can be assumed that the words in question are different. FIG. 4 shows an example of this comparison as a histogram. The histogram includes two different comparisons: the comparison between two identical words (shown in solid lines) and a comparison between two different words (shown in broken lines). The horizontal axis is the logarithmic value of the calculated distance between the feature vectors, wherein a smaller value represents a smaller distance, and the vertical axis is the histogram value. Thus, the smaller particularly the high histogram values are, i.e. the calculated distance is very small, the higher the probability that the words to be compared are the same.

FIG. 5 shows a wireless communication device 1, such as a GSM mobile phone, controlled by speech commands according to an advantageous embodiment of the invention. Only the most essential blocks for understanding the invention are presented in FIG. 5. A speech control unit 2 comprises preferably a speech recognition means 3, a speech response memory 4, a central processing unit 5, a read-only memory 6, a random access memory 7, a speech synthesizer 8, and interface means 9. A command word can be entered e.g. with a microphone 10a in the wireless communication device 1 or with a microphone 10b in a hands-free facility 17. Instructions and notices to the user can be produced e.g. with the speech synthesizer 8 either via a speaker 11a integrated in the wireless communication device 1 or via a speaker 11b in the hands-free facility 17. The speech control unit 2 according to the invention can also be implemented without the speech synthesizer 8, wherein instructions and notices to the user are transmitted preferably in text format on a display means 13 in the telecommunication device. Yet another possibility is to transmit the instructions and notices as both audio and text messages to the user. The speech response memory 4 or a part of the same can be implemented also in connection with the random access memory 7, or it can be integrated in a possible general memory space of the wireless communication device.

In the following, the operation of the wireless communication device according to the invention will be described further. For the speech control to function, the speech control unit 2 must be normally taught all the command words to be used. These have been taught preferably at the stage of manufacturing the device e.g. in a way that patterns corresponding to the command words are stored in the speech response memory 4.

At the stage of recognizing a command word, the command word uttered by the user is converted by a microphone 10a, 10b to an electrical signal and conveyed to the speech control unit 2. In the speech control unit 2, the speech recognition means 3 converts the uttered command word into feature vectors which are stored in the speech response memory 4. The speech control unit 2 additionally calculates for each command word in the vocabulary of the speech control unit 2 a probability to indicate how probably the command word uttered by the user is a certain command word in the vocabulary. After this, the speech control unit 2 examines which command word in the vocabulary has the greatest probability value, wherein this word is preliminarily selected as a recognized command word. The calculated probability for this word is still compared with a probability produced by the background noise pattern, to determine a confidence value. This confidence value is compared by the speech control unit 2 with the first threshold value Y stored in the memory of the speech control unit, preferably a read-only memory 6. If the comparison indicates that the confidence value is greater than or equal to the first threshold value Y, the speech control unit 2 deduces that the command word uttered by the user was the word with the greatest probability value. The speech control unit 2 converts this command word into a corresponding control signal, e.g. the signal for pressing the button corresponding to the command word, which is transmitted via the interface 9 to the control block 16 of the wireless communication device, or the like. The control block 16 interprets the command and executes it as required, in a manner known per se. For example, the user can enter a desired telephone number by saying it or by pressing the corresponding buttons.

In case the comparison above indicated that the confidence value is smaller than the first threshold value Y, a second comparison is made to the second threshold value A. If the comparison indicates that the confidence value is greater than or equal to the second threshold value A, the speech control unit 2 extends the time limit determined for recognizing the command word and waits if the user will utter the command word again. If the speech control unit 2 detects that the user utters a speech command within said time limit, the speech control unit takes all the measures presented above in the description of the advantageous embodiment of the invention, i.e. forming the feature vectors and storing them in the speech response memory 4, calculating the probabilities and a new confidence value. Next, a new comparison is made between the confidence value and the first threshold value Y. If the confidence value is greater than or equal to the first threshold value Y, the speech control unit 2 interprets that the speech command was recognized correctly, wherein the speech control unit 2 converts the speech command into the corresponding control signal and transmits it to the control block 16. However, if the confidence value is smaller than the first threshold value Y, the speech control unit 2 makes a comparison between the feature vectors of the first and second words uttered and stored in the speech response memory 4. This comparison involves first time warping of the feature vectors and then calculating the distance between the words, as described above in connection with the description of the method. On the basis of these calculated distances, the speech control unit 2 deduces whether the words uttered by the user were the same or different words. If they were different words, the speech control unit 2 did not recognize the command word and neither will it form a control signal. If the command words were probably the same, the speech control unit 2 converts the command word to the corresponding control signal.

In case the first command word was not recognized with sufficient confidence and the user does not repeat the command word within the time limit, the command word is not accepted. In this case too no control signal is transmitted to the control block 16.

To increase the convenience of use of the wireless communication device 1 in those cases where the first recognition of the command word did not provide a sufficiently reliable recognition, the user can be informed of the failure of the recognition of the first stage and be requested to utter the command word again. The wireless communication device 1 forms e.g. an audio message with a speech synthesizer 8 and/or a visual message on a display means 13. The wireless communication device 1 can inform the user with an audio and/or visual signal also in a situation where the recognition was successful. Thus it will not remain obscure to the user whether the recognition was successful or not. This is particularly useful under noisy use conditions.

Warping of feature vectors and calculating of distances between words is prior art known per se, why these are not disclosed here in more detail. It is obvious that the present invention is not limited solely to the embodiments presented above but it can be modified within the scope of the appended claims.

What is claimed is:

1. A method for recognizing speech commands, in which a group of command words selectable by speech commands are defined, a time window is defined, within which the recognition of the speech command is performed, and a first recognition stage is performed, in which the recognition result of the first recognition stage is selected, characterized in that further in the method:

a first confidence value is determined for the recognition result of the first recognition stage, a first threshold value (Y) is determined, said first confidence value is compared with said first threshold value (Y), if said first confidence value is greater than or equal to said first threshold value (Y), the recognition result of the first recognition stage is selected as the recognition result of the speech command, if said first confidence value is smaller than said first threshold value (Y), a second recognition stage is performed for the speech command, wherein said time window is extended, and
a second confidence value is determined for the recognition result of the second recognition stage,
said second confidence value is compared with said threshold value (Y),
if said second confidence value is greater than or equal to said first threshold value (Y), the command word selected at the second stage is selected as the recognition result for the speech command,
if said second confidence value is smaller than said first threshold value (Y), a comparison stage is performed, wherein
feature vectors obtained from the first and second recognition stages are compared to each other to determine a probability that they are substantially the same, wherein if the probability exceeds a predetermined value, the command word selected at the second stage is selected as the recognition result for the speech command.

2. The method according to claim 1, characterized in that at said recognition stages, a probability is determined for one or several said command words, at which the speech command uttered by the user corresponds to said command word, wherein the command word with the greatest determined probability is selected as the recognition result of said recognition stages.

3. The method according to claim 1, characterized in that in the method an additional second threshold value (A) is determined, wherein the second recognition stage and the comparison stage are performed only if said first confidence value is greater than said second threshold value (A).

4. The method according to claim 3, characterized in that the comparison stage is performed only if said second confidence value is greater than said second threshold value (A).

5. The method according to claim 1, characterized in that for determining the first confidence value, a probability is determined for the first speech command being background noise, wherein the first confidence value is formed on the basis of the probability determined for the command word selected as the recognition result of the first recognition stage, and the background noise probability.

6. The method according to claim 1, characterized in that for determining the second confidence value, a probability is determined for the second speech command being background noise, wherein the second confidence value is formed on the basis of the probability determined for the command word selected as the recognition result of the second recognition stage, and the background noise probability.

7. A speech recognition device, in which a vocabulary of selectable command words is defined, the device comprising means (5) for measuring the time used for recognition and comparing it with a predetermined time window, and means (3, 4, 5) for selecting a first recognition result, characterized in that the speech recognition device further comprises:
means (3, 5) for calculating a first confidence value for said first recognition result,
means (5) for comparing said first confidence value with a predetermined first threshold value (Y), wherein the first recognition result is arranged to be selected as a final recognition result, if said first confidence value is greater than or equal to said first threshold value (Y), and
means (5) for performing the recognition stage of a second speech command, if said first confidence value is smaller than said first threshold value (Y), the means for performing the recognition stage of the second speech command comprising:
means (5) for extending said time window,
means (3, 4, 5) for selecting a second recognition result of the recognition stage of the second speech command,
means (5) for calculating a second confidence value for said second recognition result,
means (5) for comparing said second confidence value with the predetermined first threshold value (Y), wherein the second recognition result is arranged to be selected as the final recognition result, if said second confidence value is greater than or equal to said first threshold value (Y), and
means (3, 4, 5) for performing a comparison stage, the comparison stage being arranged to be performed if said second confidence value is smaller than said first threshold value (Y), wherein the means for performing a comparison stage includes a device for comparing feature vectors obtained at the first and second recognition stages to each other to determine a probability that they are substantially the same, wherein if the probability exceeds a predetermined value, the second recognition result is selected as the final recognition result.

8. The speech recognition device according to claim 7, characterized in that the means for performing the comparison stage comprise means (3, 4, 5) for comparing the first and second recognition results.

9. A wireless communication device comprising means for recognizing speech commands, in which a vocabulary of selectable command words is defined, the means for recognizing speech commands comprising means (5) for measuring the time used for recognition and comparing it with a predetermined time window, and means (3, 4, 5) for selecting a first recognition result, characterized in that the means for recognizing speech commands further comprises:
means (3, 5) for calculating a first confidence value for said first recognition result,
means (5) for comparing said first confidence value with a predetermined first threshold value (Y), wherein the first recognition result is arranged to be selected as a final recognition result, if said first confidence value is greater than or equal to said first threshold value (Y), and
means (5) for performing the recognition stage of a second speech command, if said first confidence value is smaller than said first threshold value (Y), the means for performing the recognition stage of the second speech command comprising:
means (5) for extending said time window,
means (3, 4, 5) for selecting a second recognition result of the recognition stage of the second speech command,
means (5) for calculating a second confidence value for said second recognition result,
means (5) for comparing said second confidence value with the predetermined first threshold value (Y), wherein the second recognition result is arranged to be selected as the final recognition result, if said second confidence value is greater than or equal to said first threshold value (Y), and
means (3, 4, 5) for performing a comparison stage, the comparison stage being arranged to be performed if said second confidence value is smaller than said first threshold value (Y), wherein the means for performing a comparison stage includes a device for comparing feature vectors obtained from the first and second recognition stages to each other to determine a probability that they are substantially the same, wherein if the probability exceeds a predetermined value, the second recognition is selected as the final recognition result.

10. A method for recognizing speech commands comprising:

calculating a first confidence value for a first utterance;

accepting the first utterance as a command word if the first confidence value equals or exceeds a threshold;

calculating a second confidence value for a second utterance if the first confidence value is less than the threshold;

accepting the second utterance as a command word if the second confidence value equals or exceeds the threshold; and if the second confidence value is less than the threshold, accepting the second utterance as a command word if the first and second utterances are compared to each other and determined to be substantially the same.

11. The method of claim 10, wherein calculating the first and second confidence values comprises:

calculating a probability for each of a plurality of command words that the individual command word is the utterance; and comparing the probability of the individual command word having the greatest probability with a probability produced by a background noise model.

12. The method of claim 10, wherein determining if the first and second utterances are substantially the same comprises comparing feature vectors of the first and second utterances utilizing time warping.

13. A method for recognizing one or more utterances, in which a group of command words selectable by utterances are defined, a time window is defined, within which the recognition of an utterance is performed, and a first recognition stage is performed, the method further comprising:

determining a first confidence value for a first utterance;

determining a first threshold value;

comparing the first confidence value to the first threshold value;

selecting the first utterance as one of the group of command words if the first confidence value is greater than or equal to the first threshold value:

performing a second recognition stage if the first confidence value is smaller than the first threshold value, the second recognition stage comprising:

extending the time window;

determining a second confidence value for a second utterance;

comparing the second confidence value to the first threshold value;

accepting the second utterance as one of the group of command words if the second confidence value is greater than or equal to the first threshold value;

performing a comparison stage if the second confidence value is smaller than the first threshold value, the comparison stage comprising:

comparing the first and second utterances to each other to determine a probability that they are substantially the same, and selecting the second utterance as one of the group of command words if the probability exceeds a predetermined value.

14. A speech recognition device, in which a vocabulary of selectable command words is defined, the device comprising means for measuring the time used for recognition and comparing it with a predetermined time window, the speech recognition device further comprising:

means for calculating a first confidence value for a first utterance;

means for comparing the first confidence value with a predetermined first threshold value and selecting the first utterance as a command word if the first confidence value is greater than or equal to the first threshold value; and means for recognizing a second utterance if the first confidence value is smaller than the first threshold value, the means for recognizing the second utterance comprising:

means for extending the time window for recognizing the second utterance;

means for calculating a second confidence value for the second utterance;

means for comparing the second confidence value with the predetermined first threshold value and selecting the second utterance as a command word if the second confidence value is greater than or equal to the first threshold value, and means for performing a comparison stage if the second confidence value is smaller than the first threshold value, wherein the means for performing a comparison stage includes a device for comparing the first and second utterances to each other to determine a probability that they are substantially the same, wherein if the probability exceeds a predetermined value, the second utterance is selected as a command word.

* * * * *